United States Patent
Bhadravati Ramakrishna Bhat et al.

(10) Patent No.: US 11,637,779 B2
(45) Date of Patent: Apr. 25, 2023

(54) APPLICATION CLASSIFICATION DISTRIBUTION TO NETWORK DEVICES

(71) Applicant: HEWLETT PACKARD ENTERPRISE DEVELOPMENT LP, Houston, TX (US)

(72) Inventors: Mohan Ram Bhadravati Ramakrishna Bhat, Bangalore (IN); Hao Lu, Santa Clara, CA (US); Shravan Kumar Vuggrala, Bangalore (IN); Raghunandan Prabhakar, Bangalore (IN); Haifeng Zhang, Beijing (CN)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 17/387,003

(22) Filed: Jul. 28, 2021

(65) Prior Publication Data
US 2023/0035399 A1 Feb. 2, 2023

(51) Int. Cl.
*H04L 47/20* (2022.01)
*H04L 47/2441* (2022.01)
(Continued)

(52) U.S. Cl.
CPC ............ *H04L 47/20* (2013.01); *H04L 45/742* (2013.01); *H04L 47/2441* (2013.01); *H04L 47/2475* (2013.01); *H04L 47/2483* (2013.01)

(58) Field of Classification Search
None
See application file for complete search history.

(56) References Cited

U.S. PATENT DOCUMENTS 7,769,875 B1 8/2010 Moisand et al.
2019/0082360 A1* 3/2019 Henry ............... H04W 36/0016
(Continued)

FOREIGN PATENT DOCUMENTS

EP 3188440 A1 7/2017
WO WO-2020029167 A1 2/2020

OTHER PUBLICATIONS

Chen, T. et al., "Pache: A Packet Management Scheme of Cache in Data Center Networks," Jul. 30, 2019, vol. 31, No. 2, pp. 253-265, https://ieeexplore.ieee.org/document/8781932.
(Continued)

*Primary Examiner* — Anh Ngoc M Nguyen
(74) *Attorney, Agent, or Firm* — Mauriel Kapouytian Woods LLP

(57) ABSTRACT

Some examples relate to distributing application classification entries to network devices. An example includes receiving, by a processing resource in a cloud computing system, an application classification entry for an application from respective network devices on a network. The application classification entry may comprise a given application identifier for identifying the application and control information for routing a network packet originating from the application. For the given application identifier, the processing resource may generate a consolidated set of application classification entries, based on the application classification entry received from respective network devices. The processing resource may then determine appropriate network devices to distribute the consolidated set of application classification entries.

19 Claims, 8 Drawing Sheets

(51) Int. Cl.
*H04L 45/74* (2022.01)
*H04L 47/2475* (2022.01)
*H04L 47/2483* (2022.01)

(56) References Cited

U.S. PATENT DOCUMENTS

2020/0162369 A1* 5/2020 R .................. H04L 63/1416
2021/0058306 A1* 2/2021 Szigeti ............ H04L 41/0686

OTHER PUBLICATIONS

Juniper Networks, "Application Identification," Dec. 3, 2020, https://www.juniper.net/documentation/en_US/junos/topics/topic-map/security-application-identification-overview.html.

* cited by examiner

| App ID | CONTROL INFORMATION | | | 206 |
|---|---|---|---|---|
| YouTube | DESTINATION ADDRESS | DESTINATION PORT | NETWORK PROTOCOL | |

| App ID | CONTROL INFORMATION | | | |
|---|---|---|---|---|
| YouTube | DESTINATION ADDRESS | DESTINATION PORT | NETWORK PROTOCOL | 306 |
| | DESTINATION ADDRESS | DESTINATION PORT | NETWORK PROTOCOL | 308 |
| | DESTINATION ADDRESS | DESTINATION PORT | NETWORK PROTOCOL | 310 |

APPLICATION CLASSIFICATION DISTRIBUTION TO NETWORK DEVICES

BACKGROUND

Policy-based routing (PBR) is a technique to forward or route data packets based on policies. PBR allows network administrators to define routing behavior based on application parameters. Selective policies may be applied based on specific application parameters such as source and destination IP address, traffic type, source or destination port, protocols, etc. Data packets get routed according to predefined routes based on selected policies.

BRIEF DESCRIPTION OF THE DRAWINGS

For a better understanding of the solution, examples will now be described, with reference to the accompanying drawings, in which:

FIG. 2 is a block diagram of an application classification entry for an application identifier, according to some examples;

FIG. 3 is a block diagram of a consolidated set of application classification entries for an application identifier, according to some examples;

DETAILED DESCRIPTION

Figure 1:
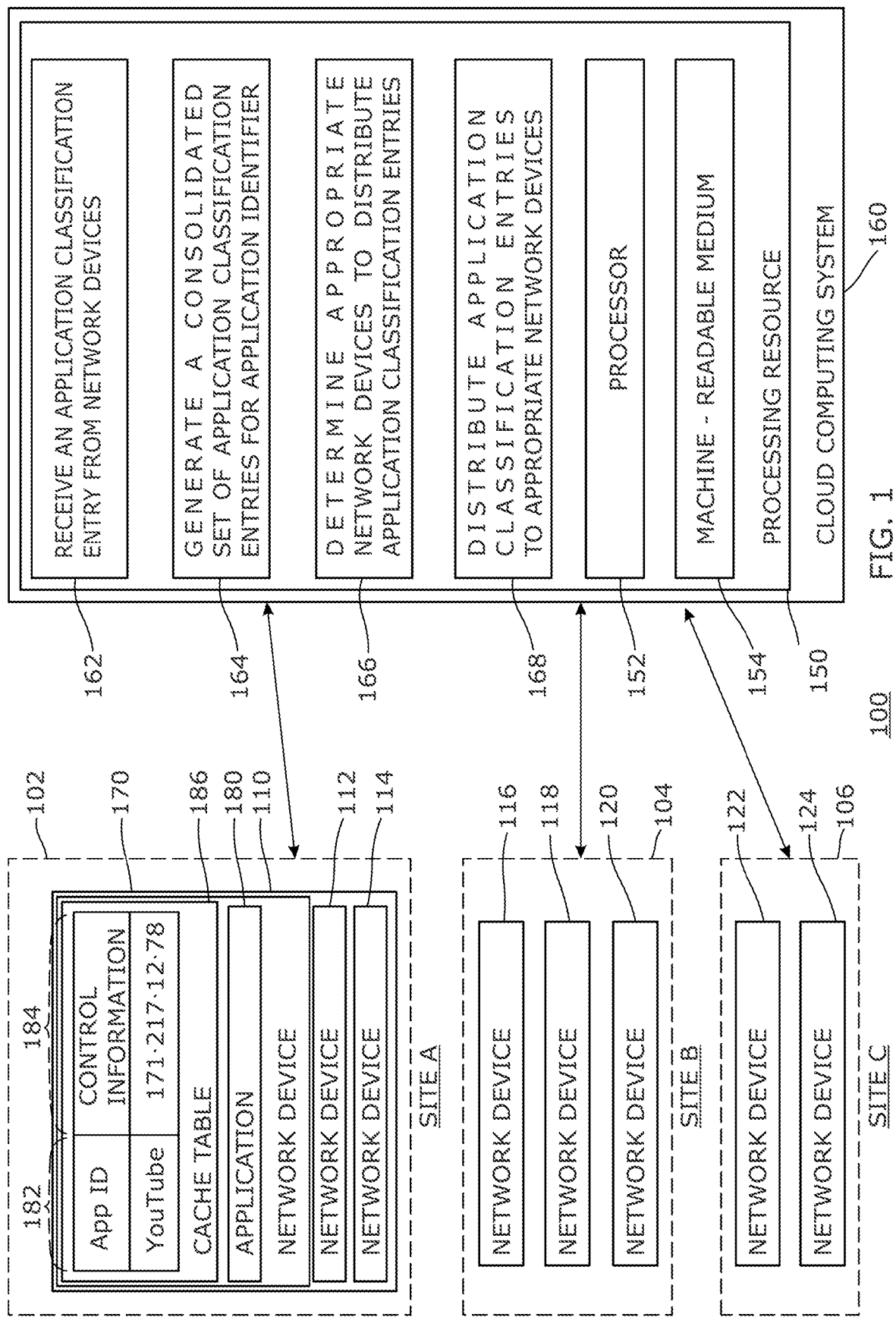
FIG. 1 is a block diagram of a computing environment for distributing application classification entries to network devices, according to some examples.

Policy-based routing policies may be used in network deployments such as campus and branch deployments. Often these PBR policies specify an application ID, identifying an application, to modify the packet routing behavior for application traffic. For the PBR policies to be applied with a correct application ID-based rule, it is desirable to classify the very first packet of a flow to determine the application ID. Without first packet classification, a Deep Packet Inspection (DPI), which is a type of data processing that inspects the data being sent over a computer network, may require multiple packets to identify the application ID. After the packet classification happens, an application session is run through a post-classification firewall to apply application-based rules. Since the session is already created and few packets in the session may have been forwarded by then, not all PBR rules may be honored at this point. Thus, without the ability to classify the session using the first packet, it can be challenging to apply PBR policies.

It can also be challenging to apply PBR policies in distributed network deployments where multiple remote offices may be connected to a corporate network via the Internet. Each node in the network may have to individually run network packets through a DPI tool for application classification, which is sub-optimal. In another scenario, if a client device roams or fails over from one node to another node during an application session or when another station initiates a flow for the same application, the packet classification may have to be performed again. In yet another scenario, if a device reboots, the local cache may be lost and packet classification needs to be carried out again for new flows, which is not desirable as well.

Examples disclosed herein address the aforesaid technological challenges by providing a seamless solution for application classification so that there is no impact upon failover or during roaming. This may be achieved by maintaining local application classification entries on individual network nodes of a network and publishing the local application classification entries from individual nodes to a central entity (e.g., in a cloud system). The central entity may consolidate the individual application classification entries that it receives and distribute a consolidated set of application classification entries to all nodes on the network. In this way, re-classification of new sessions on each node (e.g., via a DPI tool) may be avoided and a PBR policy can be applied to application traffic based on first packet classification. Further, by sharing an application classification learned on any node with other nodes through a central entity, the examples disclosed herein may provide a seamless behavior to end-users upon roaming or failover. Furthermore, since a consolidated set of application classification entries is made available on a central entity, in the event a node reboots, it can quickly restore its classification entries from the central entity. The proposed solution significantly optimizes the application of a PBR policy to application traffic based on first packet classification, in the entire network.

In some examples, a method is provided that includes receiving, by a processing resource in a cloud computing system, an application classification entry for an application from respective network devices on a network. The application classification entry may comprise a given application identifier for identifying the application and control information for routing a network packet originating from the application. For the given application identifier, the processing resource may generate a consolidated set of application classification entries, based on the application classification entry received from respective network devices. The processing resource may then determine appropriate network devices to distribute the consolidated set of application classification entries. Upon receipt, the consolidated set of application classification entries may allow a recipient network device to apply a Policy-Based Routing (PBR) policy to network packets originating from the application.

In some examples, a system is to receive an application classification entry for an application from a local cache table of respective network devices on a network. The application classification entry may comprise a given application identifier for identifying the application and control information for routing a network packet originating from the application. For the given application identifier, the system may generate a consolidated set of application classification entries, based on the application classification entry received from respective network devices. The system may then determine appropriate network devices to distribute the consolidated set of application classification entries.

In some examples, a non-transitory machine-readable storage medium includes instructions to receive an application classification entry for an application from respective network devices on a network. The application classification entry may comprise a given application identifier for identifying the application and control information for routing a network packet originating from the application. For the given application identifier, the instructions may generate a consolidated set of application classification entries, based on the application classification entry received from respective network devices. The instructions may then determine appropriate network devices to distribute the consolidated set of application classification entries.

Referring now to the figures, FIG. 1 is a block diagram of an example computing environment 100 for distributing application classification entries to network devices.

In an example, computing environment 100 may include a first computer network 102, a second computer network 104, a third computer network 106, and a cloud computing system 160. In an example, first computer network 102, second computer network 104, and third computer network 106 may each represent a first local area network (LAN) 102, a second LAN 104, and a third LAN 106, respectively.

In an example, first LAN 102 may include network devices 110, 112, and 114; second LAN 104 may include network devices 116, 118, and 120; and third LAN 106 may include network devices 122 and 124. Some non-limiting examples of aforesaid network devices (e.g., 110, 112, 114, etc.) may include an Access Point (AP), a gateway device, etc. As used herein, the term "Access Point" (AP) refers to a networking device that allows wireless-capable devices to connect to a wired network. As used herein, a "gateway device" refers to a networking device to which Access Points send network traffic for further processing.

In an example, first LAN 102, second LAN 104, and third LAN 106 may each be present at different sites, for example, site A, site B, and site C, respectively. As used herein, the term "site" refers to a pre-defined physical space in a geographical area. Some examples of a "site" may include a floor of a building, a building, a campus, etc.

Although three LANs are shown in FIG. 1, in other examples of this disclosure, computing environment 100 may include more or fewer than three LANs, and each of the LANs may include more or fewer than the number of network devices depicted in the example computing environment 100 of FIG. 1. In some examples, one of the LANs (e.g., 102, 104, or 106) may be part of a campus network or branch network. As used herein, a "campus network" refers to a computer network made up of an interconnection of local area networks (LANs) within a limited geographical area. As used herein, a "branch network" refers to network elements that are used to distribute information to or from a branch of an organization.

Each of the three LANs may be communicatively coupled to cloud computing system 160, for example, via a computer network. The computer network may be a wireless or wired network. The computer network may include, for example, a Wide Area Network (WAN), a Metropolitan Area Network (MAN), a Storage Area Network (SAN), a Campus Area Network (CAN), or the like. Further, the computer network may be a public network (for example, the Internet) or a private network.

As used herein, the term "cloud computing system" (or "cloud") refers to on-demand network access to a shared pool of information technology resources (e.g., networks, servers, storage, and/or applications). Cloud computing system 160 may include a public cloud system, a private cloud system, or a hybrid cloud system. Cloud computing system 160 may be used to provide or deploy various types of cloud services. These may include Infrastructure as a Service (IaaS), Platform as a Service (PaaS), Software as a Service (SaaS), and so forth. IaaS is a type of cloud computing service that offers compute, storage and networking resources on demand. PaaS provides a platform with cloud components that can be used to build upon and create customized applications. SaaS is a way of delivering applications over the Internet—as a service. Instead of installing and maintaining software, applications are accessed via the Internet, In an example, cloud computing system 160 may include a processing resource 150. Examples of processing resource 150 may include a computing device, a server, a desktop computer, a smartphone, a laptop, a network device, dedicated hardware, a virtualized device, a virtual machine (VM), or the like.

In an example, processing resource 150 may include a processor 152 and a machine-readable storage medium 154 communicatively coupled through a system bus. Processor 152 may be any type of Central Processing Unit (CPU), microprocessor, or processing logic that interprets and executes machine-readable instructions stored in machine-readable storage medium 154. Machine-readable storage medium 154 may be a random access memory (RAM) or another type of dynamic storage device that may store information and machine-readable instructions that may be executed by processor 152. For example, machine-readable storage medium 154 may be Synchronous DRAM (SDRAM), Double Data Rate (DDR), Rambus DRAM (RDRAM), Rambus RAM, etc. or storage memory media such as a floppy disk, a hard disk, a CD-ROM, a DVD, a pen drive, and the like. In an example, machine-readable storage medium 154 may be a non-transitory machine-readable medium.

In some examples, machine-readable storage medium 154 may store machine-readable instructions (i.e. program code) 162, 164, 166, and 168 that, when executed by processor 152, may at least partially implement some or all functionalities described herein in relation to FIG. 1.

In some examples, a network device (e.g., 110) in a LAN (e.g., 102) may maintain a local application classification entry 170 for an application (e.g., YouTube) 180. Although in the description hereinafter, the functionalities are described with reference to network device 110, similar functionalities may also be performed in respect of each of the other network devices 112, 114, 116, 118, 120, 122, and 124. A local application classification entry (e.g., 170) for an application (e.g., YouTube) 180 may include, for example, a given application identifier (hereinafter also referred to as "AppID"; e.g., YouTube) 182 and control information 184 (e.g., 171.217.12.78) of application 180.

As used herein, the "application identifier" of an application refers to a tag used to identify the application. The tag may comprise of, for example, numeric characters, alphanumeric characters, symbols, alphabets, or a combination thereof. For example, "YouTube" application may be identified using an application identifier "YouTube". In this example, the application name and the application identifier are same. However, they may differ in other examples. For example, "WhatsApp" application may be identified using an application identifier "WApp".

As used herein, the "control information" refers to data for delivering a payload associated with a network packet originating from an application. In some examples, the control information may include, for example, a destination Internet Protocol (IP) address, a destination port, and network protocol information (e.g., the network protocol used for transmission).

The destination Internet Protocol (IP) address may include the address of a receiving entity (e.g., a receiving host device).

The destination port may include a destination port number to which data or a request is sent to on a receiving entity (e.g., a receiving host device).

The network protocol information may include the type of transport protocol used for communication. Examples of the network protocol may include Transmission Control Protocol (TCP) and User Datagram Protocol (UDP).

In some examples, a local application classification entry 170 may be maintained in a cache table 186 on network device 110. As used herein, the term "cache table" refers to a collection of similar cache entries. The cache table may be used to store data (e.g., local application classification entries) that is accessed frequently. The cache table can improve query performance by storing data locally (e.g., in a CPU cache).

An example application classification entry 200 for an application is illustrated in FIG. 2. The application classification entry 200 may include a given AppID (e.g., YouTube) 204 of the application and control information 206. In an example, control information may include a destination address 208, a destination port 210, and network protocol information 212.

The application may include, for example, an email application, an instant messenger application, an Internet browser application, a calendar application, a word processing application, a presentation application, and any other application capable of being executed by a processing resource (e.g., 150).

Referring back to FIG. 1, network device 110 may use a local application classification entry (e.g., 170) for an application (e.g., 180) to identify a given application identifier or "AppID" (e.g., 182) of application 180. In an example, when the first packet of a network flow from application 180 is processed by network device 110, network device 110 may determine whether an application classification entry (e.g., 170) corresponding to control information in the network packet is present on network device 110. As used herein, the term "network flow" refers to a sequence of packets from a source (e.g., an application, a source host device, etc.) to a destination (e.g., a destination device) on a network. In an example, the aforesaid determination may include identifying a destination IP address, a destination port, and network protocol information from the first packet of the network flow, and determining whether there's an application classification entry (e.g., in a cache table) that includes the aforesaid control information. In response to a determination that there's an application classification entry (e.g., 170) that includes the aforesaid control information, network device 110 may identify the AppID (e.g., 182) of application 180 from the matching application classification entry.

As mentioned earlier, in certain cases, for a PBR policy to be applied to forward or route data packets originating from an application (e.g., 180), the PBR policy may specify an AppID of the application. The PBR policy may use the AppID (e.g., 182) of the application to modify the packet routing behavior of the application's network traffic. A PBR policy, thus, may be linked with the AppID (e.g., 182) of an application (e.g., 180).

In some examples, once network device 110 identifies the AppID (e.g., 182) of an application (e.g., 180), as described above, network device 110 may apply policy-based routing (PBR) policies associated with the AppID (e.g., 182) to modify the packet routing behavior of network traffic from the application (e.g., 180). Network device 110 may use the AppID (e.g., 182) from the matching application classification entry to apply an associated PBR policy to a network flow originating from the application (e.g., 180).

In some examples, when the first packet of a network flow from an application (e.g., 180) is processed by network device 110 and it determines that there is no local application classification entry corresponding to the network flow, network device 110 may send the network packet to a classifier (not shown) present on network device 110. In an example, the classifier may be a Deep Packet Inspection (DPI) tool that parses a network packet or flow to recognize control information (e.g., network protocol) and the application behind the network flow. The classifier may be, for example, machine-executable instructions, dedicated hardware, or any combination of hardware and machine-executable instructions.

In response to receiving the first network packet from network device 110, the classifier may identify control information such as a destination IP address, a destination port, network protocol information, etc, along with a given AppID (e.g., 182) of the originating application (e.g., 180). In some examples, the classifier may use techniques including stateful inspection, behavioral and statistical analysis, heuristics, machine learning, etc. to perform the identification. The classifier then may provide the destination IP address, the destination port, network protocol information, and AppID (e.g., 182) of the originating application (e.g., 180) to network device 110.

In a similar manner, if other network devices (e.g., 112 and 116) do not have a local application classification entry corresponding to a network flow of same application 180, network devices 112 and 116 may each send the first network packet of a network flow from application 180 to a classifier present on respective network devices 112 and 116. In response, the classifier may identify a destination IP address, a destination port, network protocol information, and AppID (e.g., 182) of application 180 from the first network packet of respective network devices 112 and 116. The classifier may then provide the destination IP address, the destination port, network protocol information, and AppID (e.g., 182) of application 180 to respective network devices 112 and 116.

Referring back to the example involving network device 110, once network device 110 receives the destination IP address, the destination port, network protocol information, and AppID (e.g., 182), network device 110 may create a local application classification entry (e.g., 170), including the control information parameters for the corresponding application (e.g., 180). Network device 110 may store the local application classification entry (e.g., 170), for example, in a local cache table (e.g., 186). Network device 110 may also send the local application classification entry (e.g., 170) to processing resource 150 in cloud computing system 160.

In a similar manner, upon receipt of control information and a given AppID (e.g., 182) of an application (e.g., 180), other network devices (e.g., 112 and 116) may each create a local application classification entry with the control parameters, for the corresponding application (e.g., 180). Network devices 112 and 116 may store the local application classification entry, for example, in a respective local cache table. Network devices 112 and 116 may each send the local application classification entry to processing resource 150 in cloud computing system 160.

In an example, instructions 162 may be executed by processor 152 to receive a local application classification entry (e.g., 170) for an application (e.g., 180) from network device 110. In some examples, receiving a local application classification entry (e.g., 170) for an application (e.g., 180) may include receiving a given AppID (e.g., 182) of the application and control information (e.g., destination IP address, destination port, and network protocol information) of a network packet originating from the application (e.g., 180). In some examples, instructions 162 may be executed by processor 152 to receive a local application classification entry for the same application (e.g., 180) from other sources (e.g., network devices such as 112 and 116). In other words, processor 152 may receive the AppID (e.g., 182) and control information for the same application (e.g., 180) from other sources (e.g., network devices such as 112 and 116).

Instructions 164 may be executed by processor 152 to generate, in cloud computing system 160, a consolidated set of application classification entries for a given AppID (e.g., 182). As used herein, the term "set" is intended to include one or more items (e.g., related items, unrelated items, or a combination of related and unrelated items), and may be used interchangeably with "one or more."

As mentioned earlier, processor 152 may receive the AppID and control information for the same application (e.g., 180) from multiple sources (e.g., network devices such as 110, 112, and 116). Instructions 164 may be executed by processor 152 to consolidate those local application classification entries for an application (e.g., 180) to generate a consolidated set of entries on cloud computing system 160. In some examples, a consolidated set of application classification entries may be generated for a given AppID (e.g., 182) since an application identifier (or AppID) is a common factor across local application classification entries that may be received for an application (e.g., 180) from multiple sources (e.g., network devices 110, 112, and 116). Consolidation of application classification entries for an application (e.g., 180) may consolidate control information (e.g., destination IP address, destination port, and network protocol information) for the same AppID (e.g., 182) from different sources (e.g., network devices 110, 112, and 116).

FIG. 3. Illustrates a consolidated set of application classification entries 300 for a given AppID (e.g., YouTube) 304 of an application (e.g., YouTube). Application classification entries received for the same AppID (e.g., YouTube) 304 from different sources (e.g., network devices 110, 112, and 116) may be consolidated on cloud computing system 160 to generate a consolidated set of entries for the application. The consolidated set of entries may bring together, in some examples, different control information 306, 308, and 310 received for a given AppID 304 from different sources (e.g., network devices 110, 112, and 116 respectively).

Instructions 166 may be executed by processor 152 to determine an appropriate network device(s) to distribute the consolidated set of application classification entries for an application (e.g., 180) to. As used herein, the term "appropriate network device" refers to a network device that is selected to receive the consolidated set of application classification entries for an application identifier. In some examples, the aforesaid determination may comprise identifying all network devices on a network as "appropriate" network devices to distribute the consolidated set of application classification entries for an application (e.g., 180). However, in some examples, the determination of an appropriate network device(s) may be based on a criterion. In an example, the determination may comprise identifying a sender network device that sent an application classification entry (e.g., 170) for an application (e.g., 180) to cloud computing system (e.g., 160) and then selecting the sender network device to distribute the consolidated set of application classification entries. For instance, if network device 110 sends an application classification entry (e.g., 170) for an application (e.g., 180) to cloud computing system (e.g., 160), then network device 110 may be selected as an appropriate network device to receive the consolidated set of application classification entries.

In some examples, the determination may comprise identifying a network device from a site that includes a sender network device that sent an application classification entry (e.g., 170) for an application to cloud computing system (e.g., 160) and then selecting the identified network device to distribute the consolidated set of application classification entries. For instance, if network device 110 from "site A" sends an application classification entry (e.g., 170) for an application (e.g., 180) to cloud computing system (e.g., 160), then another network device (e.g., 114) from same "site A" may be selected as appropriate device to distribute the consolidated set of application classification entries.

In some examples, the determination may comprise identifying a network device that is under the management of a user that also manages a sender network device that sent an application classification entry (e.g., 170) for an application (e.g., 180) to cloud computing system (e.g., 160) and then selecting the identified network device to distribute the consolidated set of application classification entries. For instance, if network device 110, which may be under the management of a "user A", sends an application classification entry (e.g., 170) for an application (e.g., 180) to cloud computing system (e.g., 160), then another network device (e.g., 112), which is also under the management of same "user A", may be selected as appropriate device to distribute the consolidated set of application classification entries.

In some examples, the determination may comprise identifying a network device of a device type different from the device type of a sender network device that sent an application classification entry (e.g., 170) for an application (e.g., 180) to cloud computing system (e.g., 160) and then selecting the identified network device to distribute the consolidated set of application classification entries to. As used herein, the term "device type" may refer to include a purpose (e.g., branch network or campus network), feature (e.g., number of ports), or function (e.g., Access Point or Gateway device) performed by a network device. For instance, if network device 110, which may perform the functions of an "Access Point", sends an application classification entry (e.g., 170) for an application (e.g., 180) to cloud computing system (e.g., 160), then another network device (e.g., 112), which performs the function of a gateway device, may be selected as appropriate device to distribute the consolidated set of application classification entries.

In some examples, the determination may comprise identifying a network device from a Local Area Network (LAN) that includes a sender network device that sent the application classification entry (e.g., 170) for an application (e.g., 180) to cloud computing system (e.g., 160) and then selecting the identified network device to distribute the consolidated set of application classification entries to. For instance, if network device 110, which is part of a LAN 102, sends an application classification entry (e.g., 170) for an application (e.g., 180) to cloud computing system (e.g., 160), then another network device (e.g., 112), which is part of same LAN 102, may be selected as appropriate device to distribute the consolidated set of application classification entries.

Instructions 168 may be executed by processor 152 to distribute the consolidated set of application classification entries for an application (e.g., 180) to an appropriate network device(s), as determined above. As mentioned earlier, consolidating application classification entries for an application (e.g., 180) may bring together control information (e.g., destination IP address, destination port, and network protocol information) for the same AppID (e.g., 182) from different sources (e.g., network devices 110, 112, and 116). Thus, by distributing a consolidated set of application classification entries for an application (e.g., 180) to an appropriate network device, which may also be referred to as "recipient network device", a recipient network device is able to populate a local application classification entry for the application (e.g., 180) with different control information received from cloud computing system 160. Distributing the consolidated set of application classification entries also enable a recipient network device to detect the AppID of a network flow initiated from another network device without going through a multiple packet DPI classification. It may enable a recipient network device to apply a Policy-Based Routing (PBR) policy to a first network packet originating from an application (e.g., 180). It may enable a recipient network device to apply a Policy-Based Routing (PBR) policy to network packets originating from an application (e.g., 180).

In an example, distribution of a consolidated set of application classification entries for an application (e.g., 180) to an appropriate network device (e.g., 102) may occur over a secure channel, for example, a WebSocket channel. A WebSocket channel is a communication protocol that provides a bi-directional communication channel between a client (e.g., processing resource 150) and an end device (e.g., network device 102).

Figure 4:
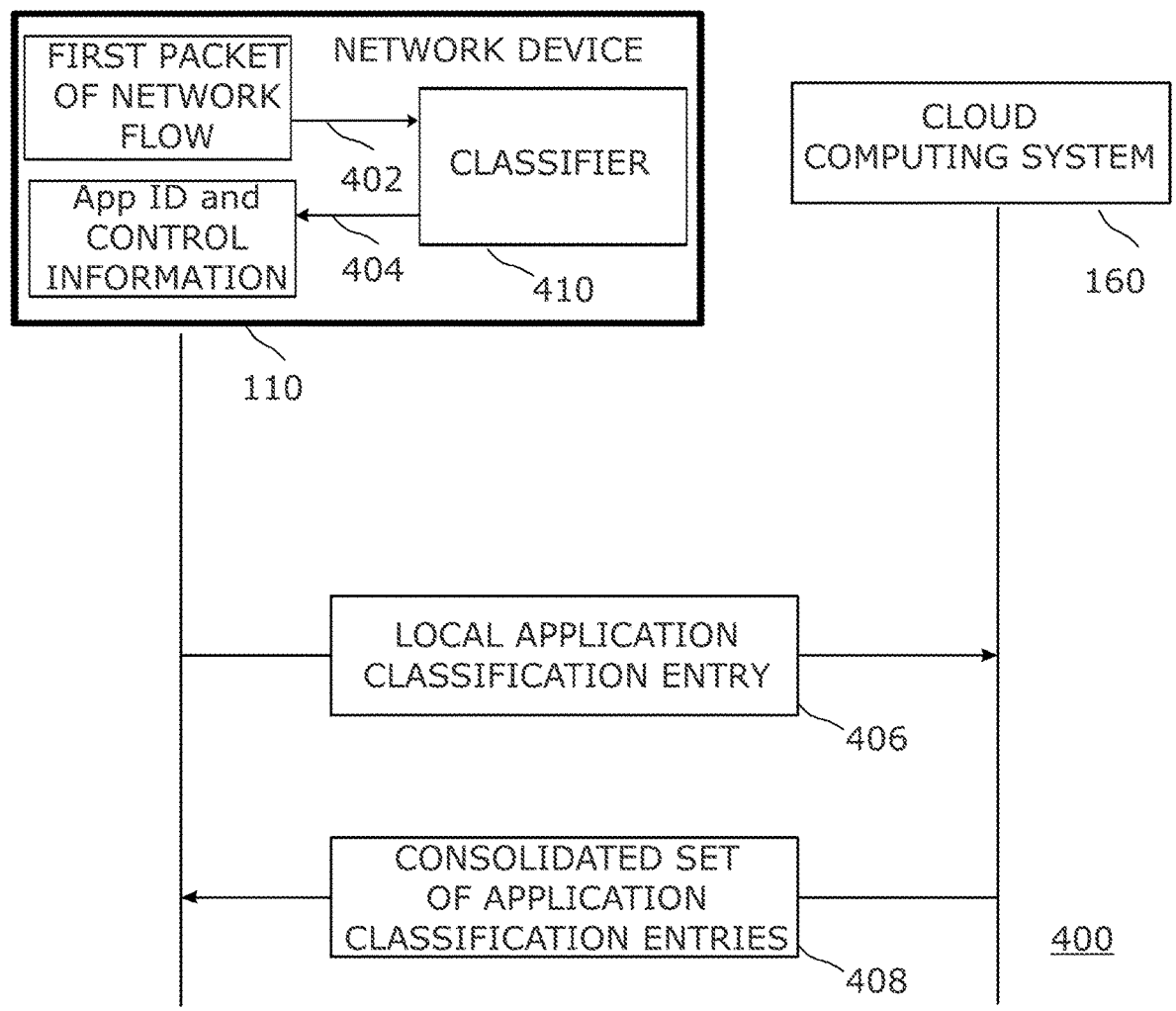
FIG. 4 illustrates a communication flow between a network device and the cloud computing system of FIG. 1, according to some examples.

FIG. 4 shows an example communication flow 400 between a network device (e.g., 110 of FIG. 1) and cloud computing system (e.g., 160 of FIG. 1). In FIG. 4, upon processing of the first packet of a network flow from an application (e.g., 180), network device 110 may determine that there is no local application classification entry corresponding to the network flow. In response to the determination, network device 110 may send the first packet 402 to a classifier 410. In an example, the classifier 410 may be a Deep Packet Inspection (DPI) tool that parses a network packet or flow to recognize control information (e.g., network protocol) and the application behind the network flow.

In response to receiving the first packet from network device 110, the classifier 410 may identify control information such as a destination IP address, a destination port, network protocol information, etc, along with a given AppID (e.g., 182) of the originating application (e.g., 180). The classifier 410 then may provide 404 control information (e.g., destination IP address, destination port, and network protocol information) along with the AppID of the originating application (e.g., 180) to network device 110.

In response to receiving control information and AppID of the originating application (e.g., 180), network device 110 may create a local application classification entry. In an example, local application classification entry may include control information (such as destination IP address, destination port, and network protocol information) and AppID of the originating application (e.g., 180). Network device 110 may store the local application classification entry (e.g., 170), for example, in a local cache table (e.g., 186). Network device 110 may also send 406 the local application classification entry to cloud computing system 160. In response, cloud computing system 160 may send 408 a consolidated set of application classification entries for an AppID to network device 110.

Figure 5:
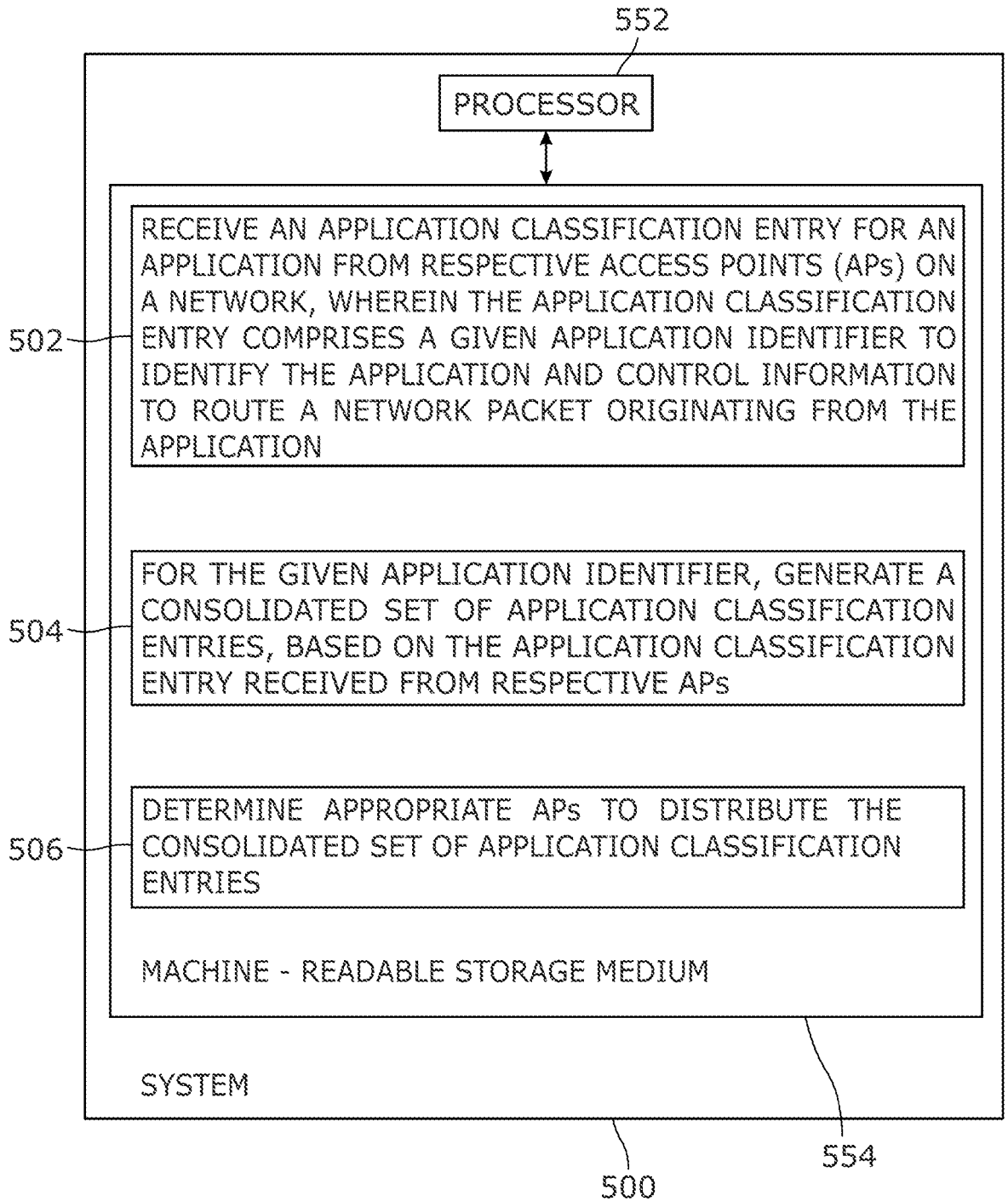
FIG. 5 is a block diagram of an example system for distributing application classification entries to network devices, according to some examples.

Referring now to FIG. 5, which is a block diagram of an example system 500 for distributing application classification entries to network devices (e.g., APs). In an example, system 500 may be analogous to processing resource 150 of FIG. 1, in which like reference numerals correspond to the same or similar, though perhaps not identical, components. For the sake of brevity, components or reference numerals of FIG. 5 having a same or similarly described function in FIG. 1 are not being described in connection with FIG. 5. Said components or reference numerals may be considered alike.

As used herein, a "system" may include a server, a computing device, a network device (e.g., a network router), a virtualized device, a mobile phone, a tablet, or any other processing device. A "system" may include software (machine-readable instructions), dedicated hardware, or a combination thereof.

In an example, system 500 may include a processor 552 and a non-transitory machine-readable storage medium 554 communicatively coupled through a system bus. Processor 552 may be any type of Central Processing Unit (CPU), microprocessor, or processing logic that interprets and executes machine-readable instructions stored in non-transitory machine-readable storage medium 554.

In an example, non-transitory machine-readable storage medium 554 may store machine-readable instructions (i.e. program code) 502, 504, and 506 that, when executed by processor 552, may at least partially implement some or all functionalities described herein in relation to FIG. 5.

In an example, instructions 502 may be executed by processor 552 of system 500 to receive an application classification entry for an application from a local cache table of respective Access Points (APs) on a network. The application classification entry may comprise a given application identifier for identifying the application and control information for routing a network packet originating from the application.

Instructions 504 may be executed by processor 552 of system 500 to generate, for the given application identifier, a consolidated set of application classification entries, based on the application classification entry received from respective APs.

Instructions 506 may be executed by processor 552 of system 500 to determine appropriate APs to distribute the consolidated set of application classification entries.

FIGS. 6A-6F are flowcharts of methods 600A, 600B, 600C, 600D, 600E, and 600F for distributing application classification entries to network devices, according to some examples. Methods 600A, 600B, 600C, 600D, 600E, and 600F, which are described below, may at least partially be executed on processing resource 150 of FIG. 1. However, other processing devices may be used as well.

Referring to method 600A, at block 602, processor 152 may execute instructions 162 to receive an application classification entry (e.g., 170) for an application (e.g., 180) from respective network devices (e.g., 110, 114, and 116) on a network. The application classification entry may comprise a given application identifier (e.g., 182) for identifying the application and control information (e.g., 184) for routing a network packet originating from the application.

At block 604, processor 152 may execute instructions 164 to generate, for the given application identifier, a consolidated set of application classification entries, based on the application classification entry received from respective network devices.

Figure 6A:
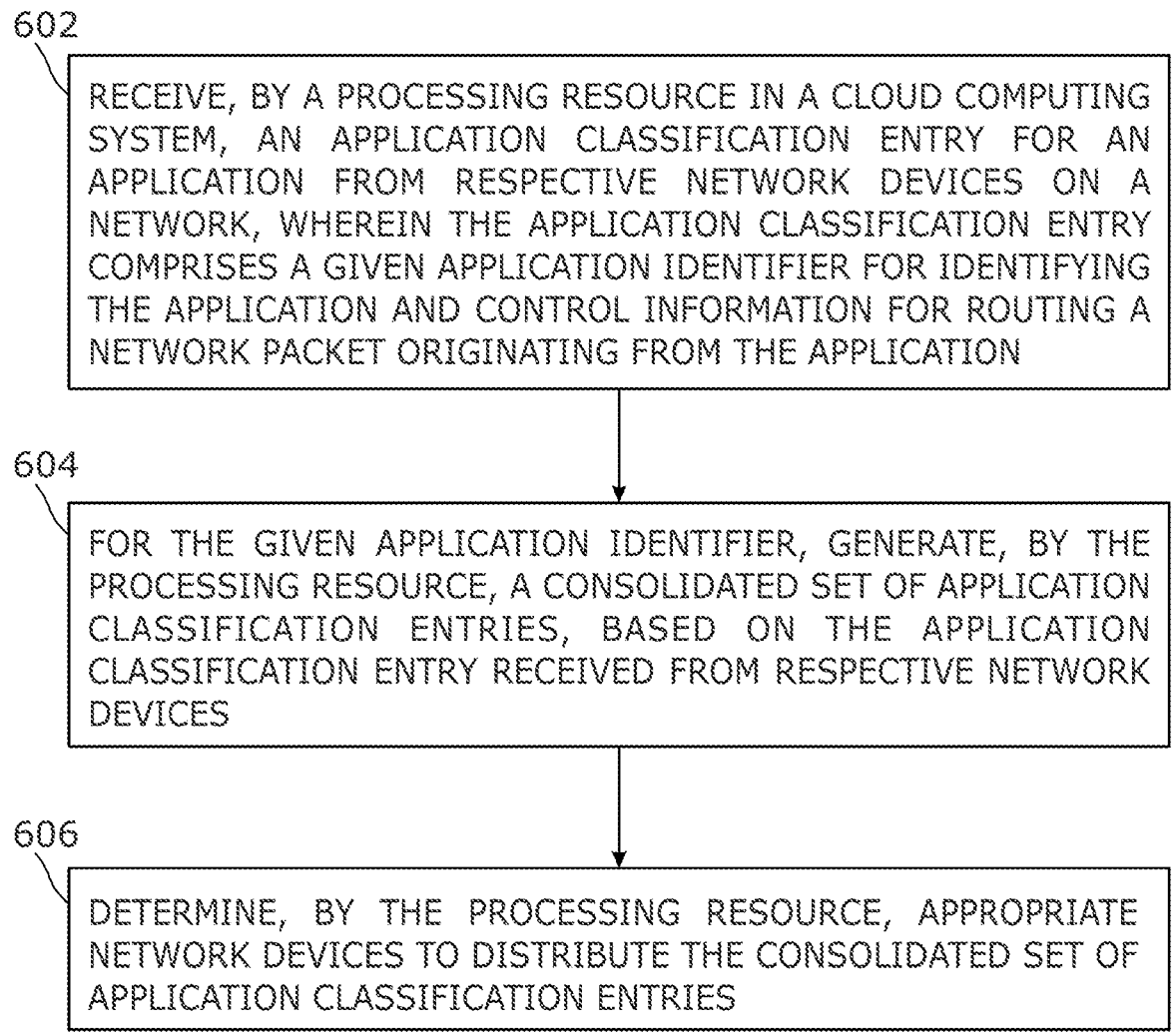
FIGS. 6A-6F are flowcharts of methods 600A, 600B, 600C, 600D, 600E, and 600F for distributing application classification entries to network devices, according to some examples.
Figure 6B:
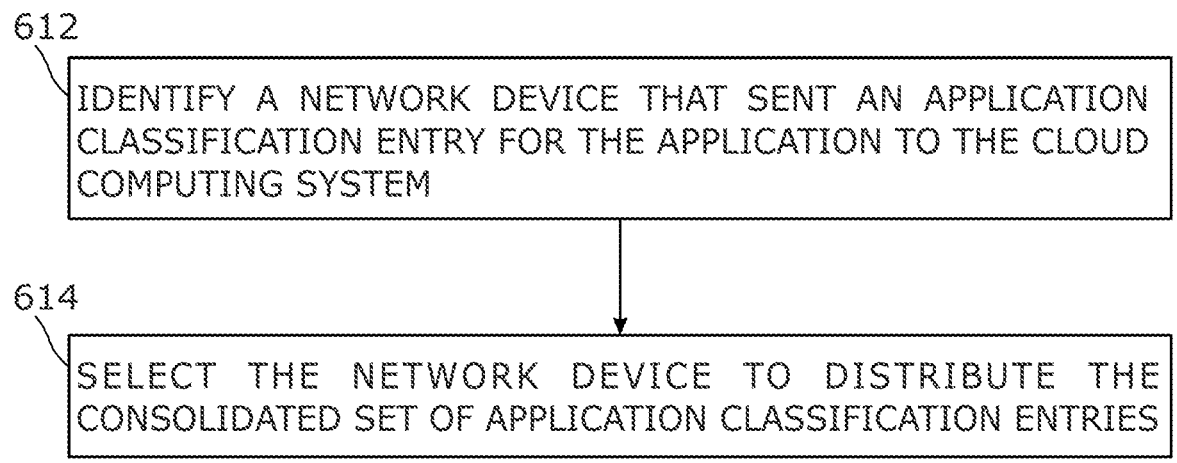

At block 606, processor 152 may execute instructions 166 to determine appropriate network devices to distribute the consolidated set of application classification entries. FIG. 6B illustrates a method 600B of determining appropriate network devices to distribute the consolidated set of application classification entries, according to some examples.

At block 612, processor 152 may execute instructions 166 to identify a network device that sent an application classification entry for the application to the cloud computing system.

At block 614, processor 152 may execute instructions 166 to select the identified network device to distribute the consolidated set of application classification entries to.

Figure 6C:
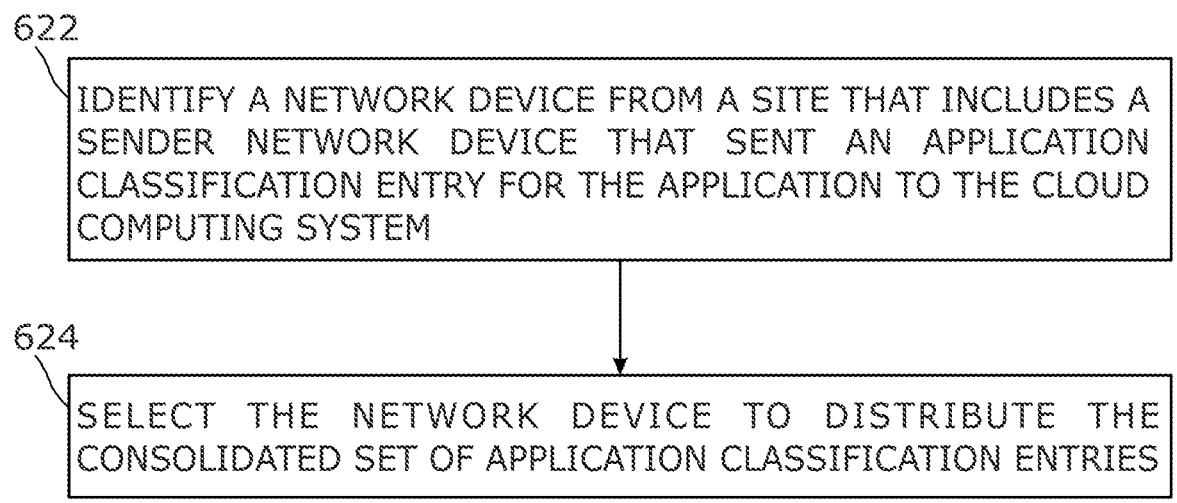

FIG. 6C illustrates another method 600C of determining appropriate network devices to distribute the consolidated set of application classification entries, according to some examples.

At block 622, processor 152 may execute instructions 166 to identify a network device from a site that includes a sender network device that sent an application classification entry for the application to the cloud computing system.

At block 624, processor 152 may execute instructions 166 to select the identified network device to distribute the consolidated set of application classification entries.

Figure 6D:
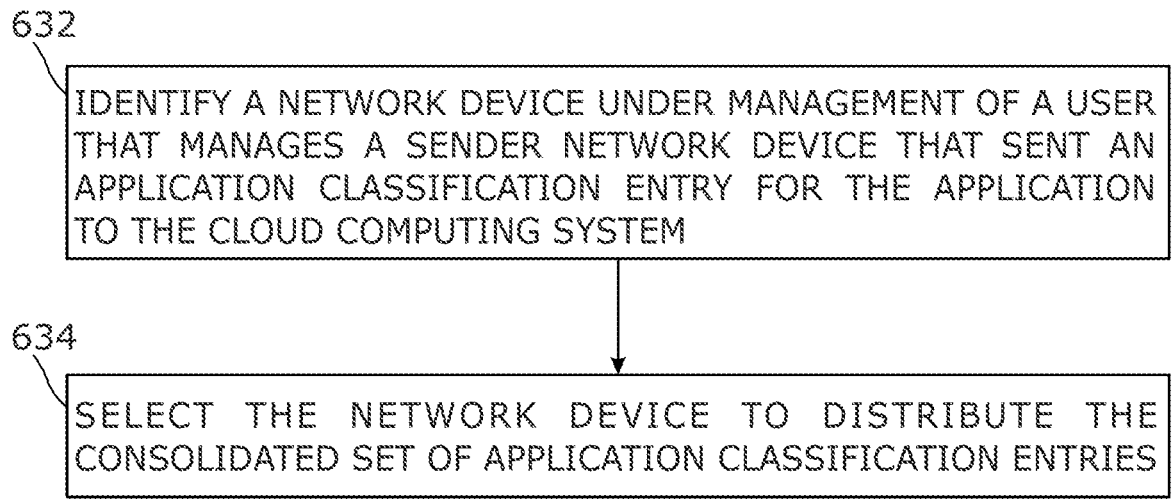

FIG. 6D illustrates another method 600D of determining appropriate network devices to distribute the consolidated set of application classification entries, according to some examples.

At block 632, processor 152 may execute instructions 166 to identify a network device under the management of a user that manages a sender network device that sent an application classification entry for the application to the cloud computing system.

At block 634, processor 152 may execute instructions 166 to select the identified network device to distribute the consolidated set of application classification entries.

Figure 6E:
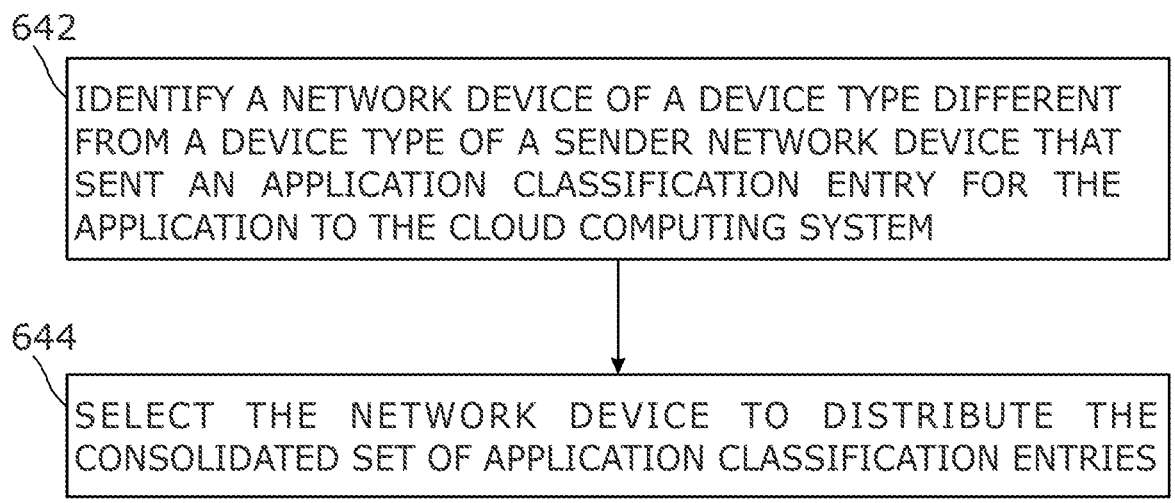

FIG. 6E illustrates another method 600E of determining appropriate network devices to distribute the consolidated set of application classification entries, according to some examples.

At block 642, processor 152 may execute instructions 166 to identify a network device of device type different from a device type of a sender network device that sent an application classification entry for the application to the cloud computing system.

At block 644, processor 152 may execute instructions 166 to select the identified network device to distribute the consolidated set of application classification entries.

Figure 6F:
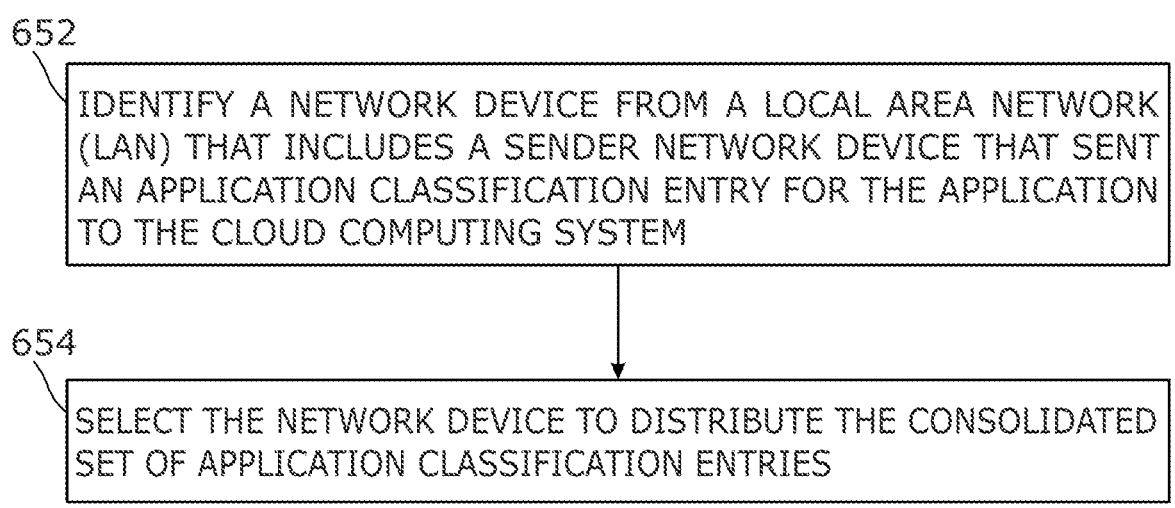

FIG. 6F illustrates another method 600F of determining appropriate network devices to distribute the consolidated set of application classification entries, according to some examples.

At block 652, processor 152 may execute instructions 166 to identify a network device from a Local Area Network (LAN) that includes a sender network device that sent an application classification entry for the application to the cloud computing system.

At block 654, processor 152 may execute instructions 166 to select the identified network device to distribute the consolidated set of application classification entries.

Figure 7:
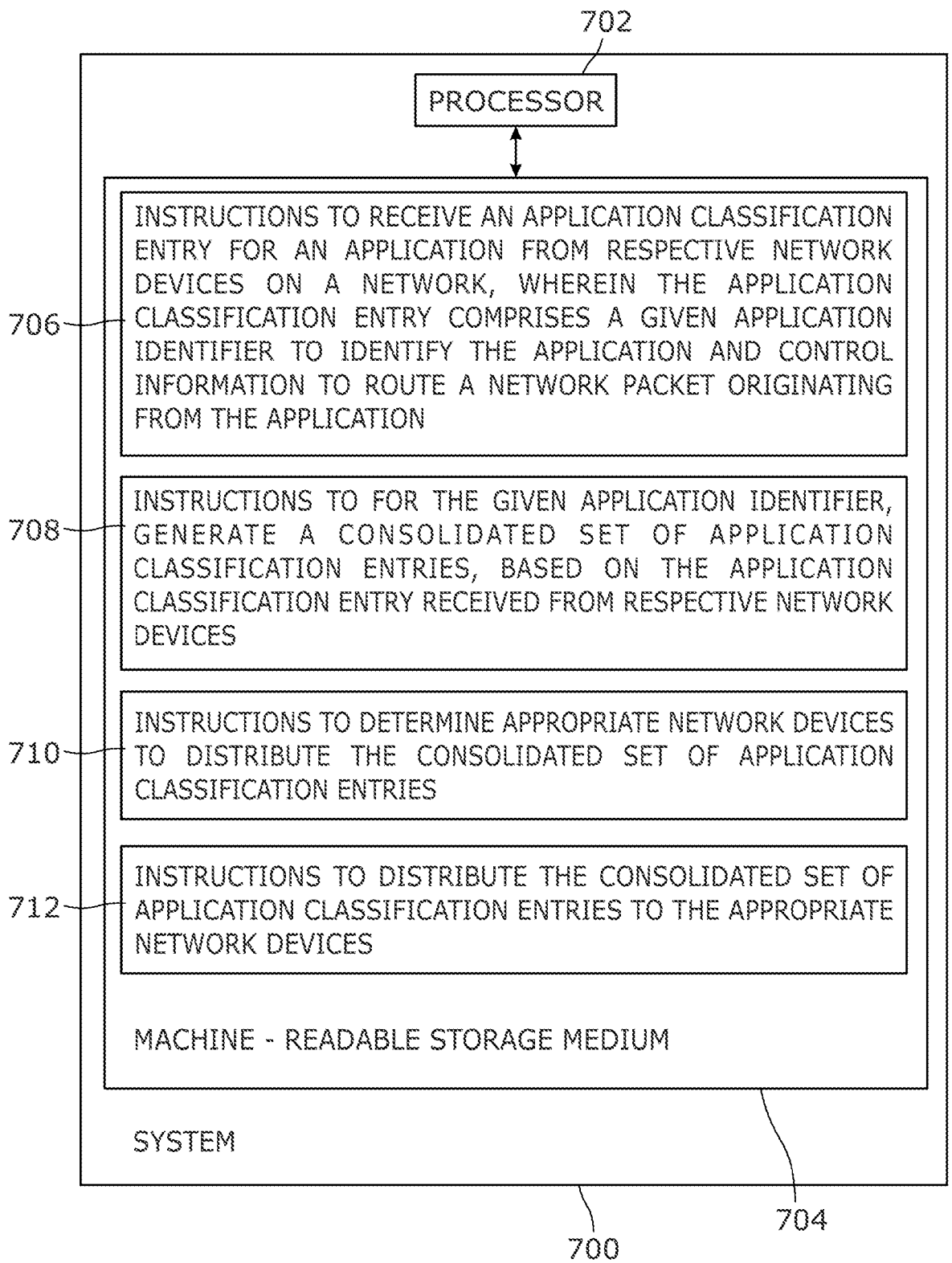
FIG. 7 is a block diagram of a system including instructions in a machine-readable storage medium for distributing application classification entries to network devices, according to some examples.

FIG. 7 is a block diagram of an example system 700 for distributing application classification entries to network devices. System 700 includes a processor 702 and a machine-readable storage medium 704 communicatively coupled through a system bus. In an example, system 700 may be analogous to processing unit 150 of FIG. 1 or system 500 of FIG. 4. Processor 702 may be any type of Central Processing Unit (CPU), microprocessor, or processing logic that interprets and executes machine-readable instructions stored in machine-readable storage medium 704. Machine-readable storage medium 704 may be a random access memory (RAM) or another type of dynamic storage device that may store information and machine-readable instructions that may be executed by processor 702. In an example, machine-readable storage medium 704 may be a non-transitory machine-readable medium. Machine-readable storage medium 704 may store instructions 706, 708, 710, and 712.

In an example, instructions 706 may be executed by processor 702 to receive an application classification entry for an application from respective network devices on a network. The application classification entry may comprise a given application identifier for identifying the application and control information for routing a network packet originating from the application.

Instructions 708 may be executed by processor 702 to generate, for the given application identifier, a consolidated set of application classification entries, based on the application classification entry received from respective network devices.

Instructions 710 may be executed by processor 702 to determine appropriate network devices to distribute the consolidated set of application classification entries.

Instructions 712 may be executed by processor 702 to distribute the consolidated set of application classification entries to the appropriate network devices.

For the purpose of simplicity of explanation, the example methods of FIGS. 6A-6F are shown as executing serially, however, it is to be understood and appreciated that the present and other examples are not limited by the illustrated order. The example systems of FIGS. 1, 4, and 7, and methods of FIGS. 6A-6F may be implemented in the form of a computer program product including computer-executable instructions, such as program code, which may be run on any suitable computing device in conjunction with a suitable operating system (for example, Microsoft Windows®, Linux®, UNIX®, and the like). Examples within the scope of the present solution may also include program products comprising non-transitory computer-readable media for carrying or having computer-executable instructions or data structures stored thereon. Such computer-readable media can be any available media that can be accessed by a general-purpose or special-purpose computer. By way of example, such computer-readable media can comprise RAM, ROM, EPROM, EEPROM, CD-ROM, magnetic disk storage or other storage devices, or any other medium which can be used to carry or store desired program code in the form of computer-executable instructions and which can be accessed by a general-purpose or special-purpose computer. The computer-readable instructions can also be accessed from memory and executed by a processor.

It should be understood that the above-described examples of the present solution are for the purpose of illustration only. Although the solution has been described in conjunction with a specific example thereof, numerous modifications may be possible without materially departing from the teachings and advantages of the subject matter described herein. Other substitutions, modifications, and changes may be made without departing from the spirit of the present solution. All of the features disclosed in this specification (including any accompanying claims, abstract, and drawings), and/or all of the steps of any method or process so disclosed, may be combined in any combination, except combinations where at least some of such features and/or steps are mutually exclusive.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

As used herein, the articles "a" and "an" are intended to include one or more items and may be used interchangeably with "one or more." Further, as used herein, the article "the" is intended to include one or more items referenced in connection with the article "the" and may be used interchangeably with "the one or more." Also, as used herein, the terms "has," "have," "having," or the like are intended to be open-ended terms. As used herein, the term "includes" is intended to mean "includes but not limited to", and the term "including" is intended to mean "including but not limited to". Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

The invention claimed is:

1. A method comprising:
receiving, by a processing resource in a cloud computing system, an application classification entry for an application from respective network devices on a network, wherein the application classification entry comprises a given application identifier for identifying the application and control information for routing a network packet originating from the application;
for the given application identifier, generating, by the processing resource, a consolidated set of application classification entries, based on the application classification entry received from respective network devices; and
determining, by the processing resource, appropriate network devices to distribute the consolidated set of application classification entries, wherein the consolidated set of application classification entries allows an appropriate network device to apply a Policy-Based Routing (PBR) policy to a first network packet originating from the application, and wherein determining comprises:
identifying a network device that sent the received application classification entry for the application; and
selecting the identified network device to distribute the consolidated set of application classification entries.

2. The method of claim 1, distributing, by the processing resource, the consolidated set of application classification entries to the appropriate network devices.

3. The method of claim 1, wherein one of respective network devices is an Access Point (AP).

4. The method of claim 1, wherein the application classification entry is stored in a local cache table of respective network devices.

5. The method of claim 1, wherein the control information comprises one or more of a destination IP address, a destination port, and network protocol information.

6. The method of claim 1, wherein determining comprises:
identifying a network device from a site that includes a sender network device that sent an application classification entry for the application to the cloud computing system; and
selecting the identified network device to distribute the consolidated set of application classification entries.

7. The method of claim 1, wherein determining comprises:
identifying a network device under management of a user that manages a sender network device that sent an application classification entry for the application to the cloud computing system; and
selecting the identified network device to distribute the consolidated set of application classification entries.

8. The method of claim 1, wherein determining comprises:
identifying a network device of a device type different from a device type of a sender network device that sent an application classification entry for the application to the cloud computing system; and
selecting the identified network device to distribute the consolidated set of application classification entries.

9. The method of claim 1, wherein determining comprises:
identifying a network device from a Local Area Network (LAN) that includes a sender network device that sent an application classification entry for the application to the cloud computing system; and
selecting the identified network device to distribute the consolidated set of application classification entries.

10. A system comprising:
a processor; and
a machine-readable medium storing instructions that, when executed by the processor, cause the processor to:
receive an application classification entry for an application from respective Access Points (APs) on a network, wherein the application classification entry comprises a given application identifier to identify the application and control information to route a network packet originating from the application;
for the given application identifier, generate a consolidated set of application classification entries, based on the application classification entry received from respective APs; and
determine appropriate APs to distribute the consolidated set of application classification entries,
wherein instructions that cause the processor to determine appropriate APs to distribute the consolidated set of application classification entries comprises instructions that, when executed by the processor, cause the processor to:
identify a network device that sent the received application classification entry for the application; and
select the identified network device to distribute the consolidated set of application classification entries.

11. The system of claim 10, further comprising instructions that, when executed by the processor, cause the processor to:
distribute the consolidated set of application classification entries to the appropriate APs, wherein the consolidated set of application classification entries allows a recipient network device to apply a Policy-Based Routing (PBR) policy to network packets originating from the application.

12. The system of claim 10, wherein the control information comprises a destination IP address, a destination port, and network protocol information.

13. The system of claim 10, wherein the application classification entry is stored in a local cache table of respective APs.

14. The system of claim 10, wherein the consolidated set of application classification entries comprises different control information received through the application classification entry for the application from respective APs.

15. A non-transitory machine-readable storage medium storing instructions that, when executed by a processor, cause the processor to:
receive an application classification entry for an application from respective network devices on a network, wherein the application classification entry comprises a given application identifier to identify the application and control information to route a network packet originating from the application;
for the given application identifier, generate a consolidated set of application classification entries, based on the application classification entry received from respective network devices;
determine appropriate network devices to distribute the consolidated set of application classification entries; and
distribute the consolidated set of application classification entries to the appropriate network devices,
wherein instructions that cause the processor to determine appropriate network devices to distribute the consolidated set of application classification entries comprises instructions that, when executed by the processor, cause the processor to:
identify a network device that sent the received application classification entry for the application; and
select the identified network device to distribute the consolidated set of application classification entries.

16. The non-transitory machine-readable storage medium of claim 15, wherein one of the respective network devices is an Access Point (AP) or a Gateway device.

17. The non-transitory machine-readable storage medium of claim 15, wherein the consolidated set of application classification entries allows a recipient network device to apply a Policy-Based Routing (PBR) policy to network packets originating from the application.

18. The non-transitory machine-readable storage medium of claim 15, wherein the network is a branch network.

19. The non-transitory machine-readable storage medium of claim 15, wherein the network is a campus network.

* * * * *